United States Patent [19]
Jain et al.

[11] Patent Number: 6,104,799
[45] Date of Patent: Aug. 15, 2000

[54] CUSTOMER DEFINED CALL SETUP

[75] Inventors: Ajay Jain, Holmdel; Ram N. S. Rathore, Randolph, both of N.J.

[73] Assignee: AT&T Corp., New York, N.Y.

[21] Appl. No.: 08/957,428

[22] Filed: Oct. 24, 1997

[51] Int. Cl.$^7$ .................................................. H04M 3/42
[52] U.S. Cl. ........................... 379/210; 379/211; 379/201
[58] Field of Search ..................................... 379/211, 210, 379/201, 212, 213, 214, 215, 86.16; 370/352

[56] References Cited

U.S. PATENT DOCUMENTS

| | | | |
|---|---|---|---|
| 5,243,645 | 9/1993 | Bissell et al. | 379/211 |
| 5,315,636 | 5/1994 | Patel | 379/211 |
| 5,329,578 | 7/1994 | Brennan et al. | 379/211 |
| 5,392,342 | 2/1995 | Rosenthal | 379/211 |
| 5,550,907 | 8/1996 | Carlsen | 379/211 |
| 5,742,674 | 4/1998 | Jain et al. | 379/209 |
| 5,802,160 | 9/1998 | Kugell et al. | 379/205 |
| 5,905,789 | 5/1999 | Will | 379/211 |

*Primary Examiner*—Krista Zele
*Assistant Examiner*—Benny Q. Tieu

[57] ABSTRACT

Algorithms for call set up and monitoring of calls intended for high end customers, who prefer to be reached any time, any where and very fast, allow for quick call set up by referring to a customer profile data base in real time during the call set up process. The customer profile database includes all network addresses (telephone numbers, e.g., day time number, evening number, wireless number, pager number, etc.) where the customer can be reached and will keep a record of the number where the customer was reached the last time. This service is implemented on a new NCP or as a new application on an existing NCP with sufficient capacity. The NCP data base includes several data elements for each customer: These include: the customer calling number indicating that a query to an NCP is needed before initiating the call set up; preferred call set up algorithm, e.g., call me where my last call completed; call according to day of the week and time of the day schedule, call all numbers simultaneously, connect directly to my mailbox or call my pager, etc.; preferred calling numbers for each day of the week and the time of day; and the calling number where the most recent call was completed. In an emergency contact all the emergency contacts in the conference mode.

17 Claims, 3 Drawing Sheets

CUSTOMER DEFINED CALL SETUP

BACKGROUND OF THE INVENTION

The present invention relates generally to methods and systems for processing telephone calls, and more particularly to a method and system for processing a telephone call according to a customer definable process.

Currently, call sequencing is known. For example, U.S. Pat. No. 5,487,111 discloses a telecommunications sequence calling system, which enables a user to specify a list of telephone numbers to call in sequence, if the user is unable to be reached at the main telephone number. According to this patent, however, the call is processed according to the predefined sequence each time, despite the fact that the customer may be moving between the telephone numbers in the sequence. Consequently, the length of the call processing can be significant and annoying to the calling party.

The present invention is therefore directed to the problem of developing a method and system for enabling a customer to define the processing of a telephone call made to the customer's telephone number so that the processing is as short as possible.

SUMMARY OF THE INVENTION

The present invention solves this problem by enabling the user to specify a sequence of telephone numbers along with a set of parameters that enable the system to adaptively and intelligently order the sequence in accordance with the specified parameters. For example, the customer can specify that the first alternate telephone number in the call sequence be the last number the customer was reached at, which is stored in a database, or the customer can specify that during certain hours (e.g., 9:00a.m.–5:00 p.m.) the first alternate telephone number in the call sequence be the business telephone, even if the last telephone number at which the customer was reached was not the business telephone number. The end result is that the customer is able to reduce the time that it takes to reach him by specifying a set of parameters that the system can use to make intelligent choices about the sequence of alternate telephone numbers.

DETAILED DESCRIPTION

The present invention defines algorithms for call set up and monitoring for calls intended for high end customers who prefer to be reached any time, any where and very fast. The algorithms allow for quick call set up by referring to a customer profile data base in real time during the call set up process. The customer profile database will include all network addresses (phone numbers, e.g., day time number, evening number, wireless number, pager number, etc.) and keep a record of the telephone number where the customer was reached the last time for use in later processing.

One embodiment of the present invention is implemented as a new Network Control Point (NCP). In the alternative, the present invention can be implemented as a new application on an existing NCP with sufficient capacity.

The NCP data base stores at least the following data elements for each customer.
1. The customer calling number indicating that a query to an NCP is needed before initiating the call set up.
2. The preferred call set up algorithm, e.g., call me where my last call completed, call according to day of the week and time of the day schedule, call all numbers simultaneously, connect directly to my mailbox or call my pager, etc.
3. The preferred calling numbers for each day of the week and the time of day.
4. The calling number where the most recent call was completed.
5. In an emergency, contact all the emergency contacts in the conference mode.

The present invention includes the following network enhancements:
1. Multi-point signaling so that all called party (customer) numbers can be dialed simultaneously to reduced the reach time and calling party experience relative to dialing one number at time until the customer is reached.
2. Collection of the most recent data on call completion to the customer, as well as storage and update of this data in near real time. The use of this measurement based intelligence to complete the call helps reduce post dial delays and eliminates sequential dialing of multiple numbers. This approach is very effective for many customers.
3. The capability to change or update customer call set up algorithms, preferably by the customer using a touch tone or some other user friendly interface, e.g., a world wide web access to NCP.

Figure 1:
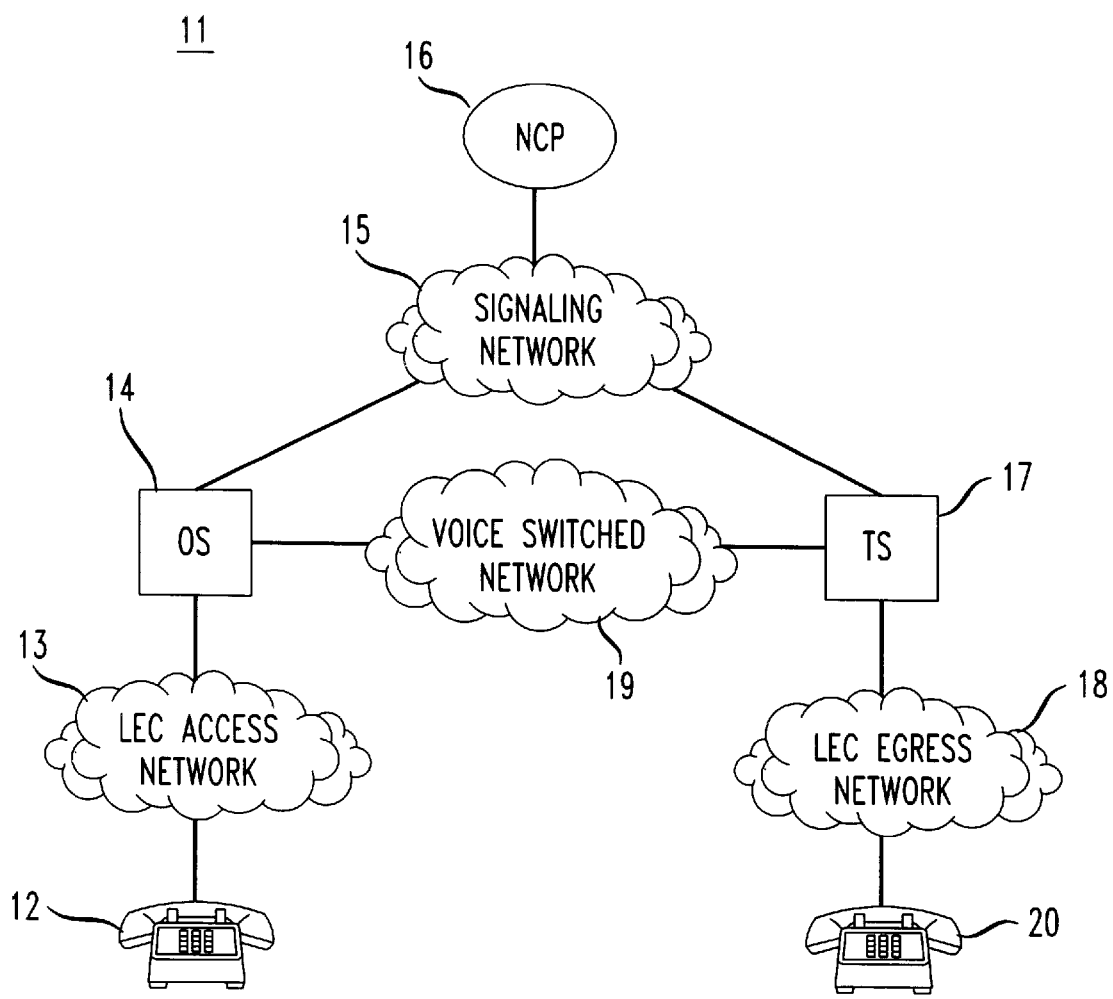
FIG. 1 depicts the customer defined call set up and monitoring network architecture of the present invention.

The architecture depicted in FIG. 1 is similar to current NCP based architecture used for database based dialing services by AT&T and other carriers. The above enhancements can be incrementally implemented by enhancing switching, signaling and data collection capabilities in the network without requiring the network to be offline.

According to the present invention, the simplified call flow will be as follows:
1. The calling party dials a number for a high-end customer.
2. The call originating toll switch (OS) recognizes this number and launches a query to the NCP.
3. The NCP returns the call set up instructions to the OS based on the customer profile.
4. The OS completes the call via the Terminating Switch (TS) and the Local Exchange Carrier (LEC) egress network.
5. Messaging or pager notification options can be invoked if the called number is busy or if there is no answer.

One possible implementation of the present invention is as a service that is provided to the calling party. Consequently, the calling party will pay for call completion on the paths or numbers referred to by the NCP data base. If a toll-free telephone number (such as an 800 or 888 telephone number) is used to reach the called party, obviously there will be no charge to the calling party.

In a situation where a call is completed simultaneously on more than one path, the calling party will pay for the call completion on all referred numbers. It is likely that some calls will be picked up simultaneously on different numbers (e.g., by children, spouse or secretary), in this case the called party will stay on line until the third parties hang up. If the called party is not available, or no one picks up the call, the called party will have the option to refer the call to a voice messaging system (i.e., a voice mailbox).

One possible implementation of the present invention includes the ability to provide a distinctive ring to alert other third parties of the network referred calls. This can help minimize simultaneous call completion on multiple numbers.

As a result of the present invention, there are many differences relative to current practice. For example, the present invention introduces a national NCP serving high-end voice telephone customers, multi-point signaling in the toll network to multiple called party numbers simultaneously, and intelligence in the toll switches to drop unused call paths when the call is completed in one of the paths. Furthermore, the present invention provides the capability to collect call completion data once the call is completed and update the NCP database for call set up if the customer has "Call Me where I was Last" feature. This set of enhancements enables a customized calling experience for a segment of highly valued customers.

Referring to FIG. 1, shown therein is the Customer Defined Call Set Up and Monitoring Network Architecture 11. The call begins with a calling party 12, who accesses the network via the Local Exchange Carrier (LEC) Access Network 13, which is connected to the Originating Switch (OS) 14. The OS 14 is in turn connected to the Signaling Network 15, which is controlled by the Network Control Point (NCP) 16. The Signaling Network 15 determines the routing of the call placed by the calling party 12 via the Voice Switched Network (VSN) 19. The call is routed to the Terminating Switch 17 in accordance with the routing determined by the Signaling Network 15. The Terminating Switch 17 is coupled both to the VSN 19 and the Signaling Network 15, and routes the call to the LEC Egress Network 18, which in turn routes the call to the called party 20.

The NCP 16 determines the routing of the call and passes the routing instructions on to the Signaling Network 15. If the called party is successfully reached at a particular telephone number, this information is made available to the NCP 16 via the Signaling Network 15, and stored therein in a database 21 accessible by the NCP 16 for later use in processing calls for the same called party 20.

To modify the routing algorithm set up by the customer, the customer can access his routing algorithm via the World Wide Web on the Internet. Each customer has a Web site that is dedicated to the customer, and can only be accessed by specifying the correct password.

To initiate the service, the customer can either telephone the service provider or access a World Wide Web site, at which the user can obtain his ID and password. The service is then billed to the customer in the normal manner. This reduces delays in establishing the service for the customer.

It is expected that each customer may require some interactivity to determine the optimum algorithm for himself, hence the Web site access provides the ease of enabling quick modifications to an existing call setup process in a very user friendly environment.

Figure 2:
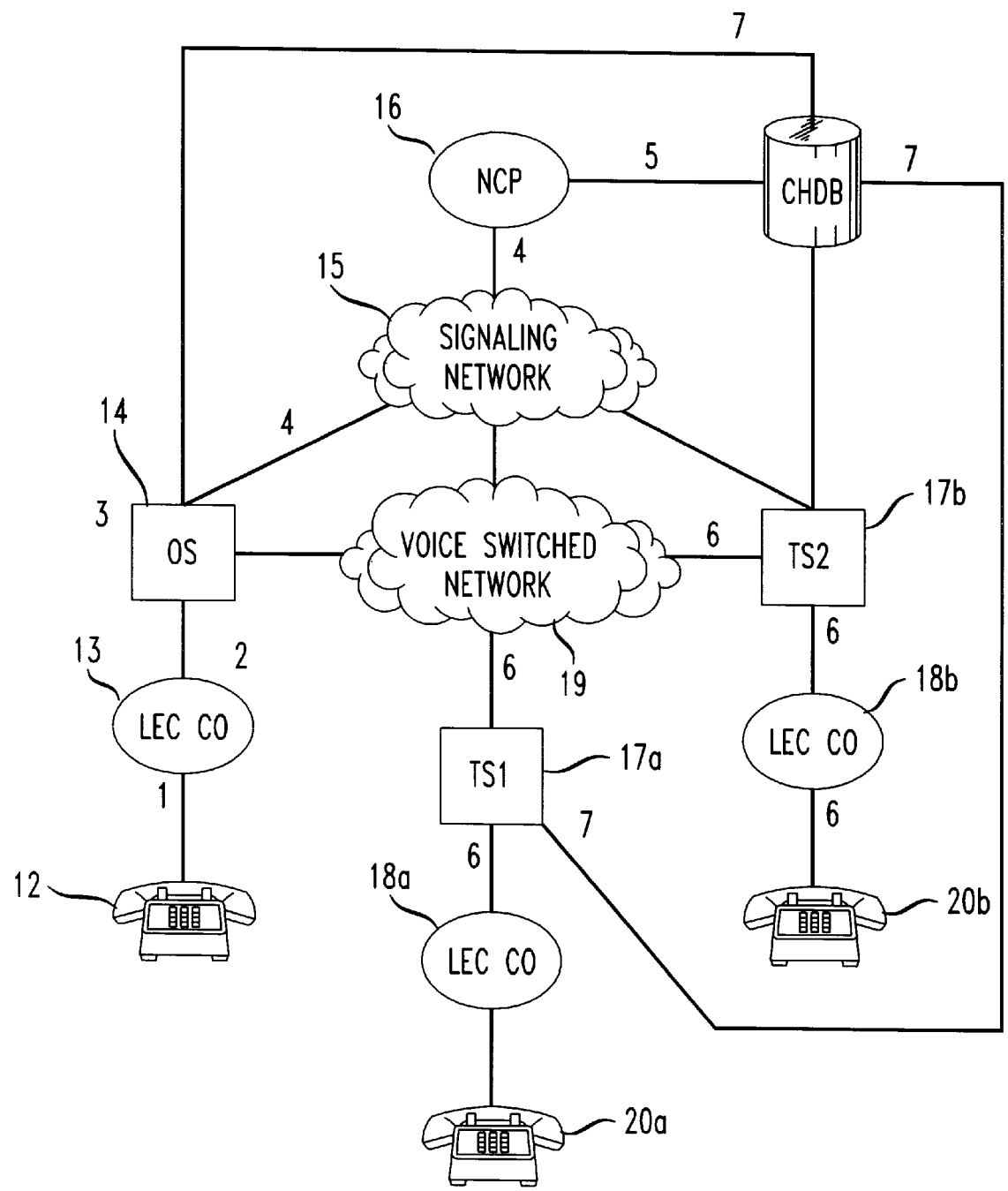
FIG. 2 depicts the call flow of the present invention for a multipoint signaling example.

Turning to FIG. 2, shown therein is the call flow according to the present invention. In addition to that shown in FIG. 1, FIG. 2 includes a second terminating switch 17b and a second Local Exchange Carrier Central Office (LEC CO) 18b, and of course, a second called party 20b. This figure depicts the parallel calling of the present invention. Each terminating switch 17a, 17b accesses the database 21 to determine the customer defined algorithm for processing the telephone call.

In accordance with the present invention, the following is an example of the processing of an emergency call. Refer to FIG. 2 when reading the following steps, as each step number 1–7 is shown in the figure next to the path of information flow during the call processing.

Step 1: The calling party 12 dials an emergency access number for a customer, who is potentially reachable at multiple calling locations 20a, 20b.

Step 2: Based on the dialed number, the Local Exchange Carrier Central Office (LEC CO) 13 forwards the called number to the Originating Switch (OS) 14.

Step 3: The called number is processed at the OS 14 and the OS 14 refers to the Network Control Point (NCP) database (i.e., the Call History Data Base, CHDB) 21 via the signaling network 15.

Step 4: The NCP 16 provides the associated customer reach numbers back to the OS 14 via the Signaling Network 15.

Step 5: In determining the reach numbers, the NCP 16 looks at the customer reach profile stored in the NCP 16 and the customer Call History Data Base (CHDB) 21 to determine where the customer originated (or received) his last call. This number is included in the list of reach numbers.

Step 6: The reach numbers are dialed simultaneously by the OS 14 to reach the customer via multiple Terminating Switches (TS1 and TS2) 17a, 17b.

Step 7: The last call origination data is collected and stored in the CHDB 21 for each customer or called party 20a, 20b for use in processing future calls.

Figure 3:
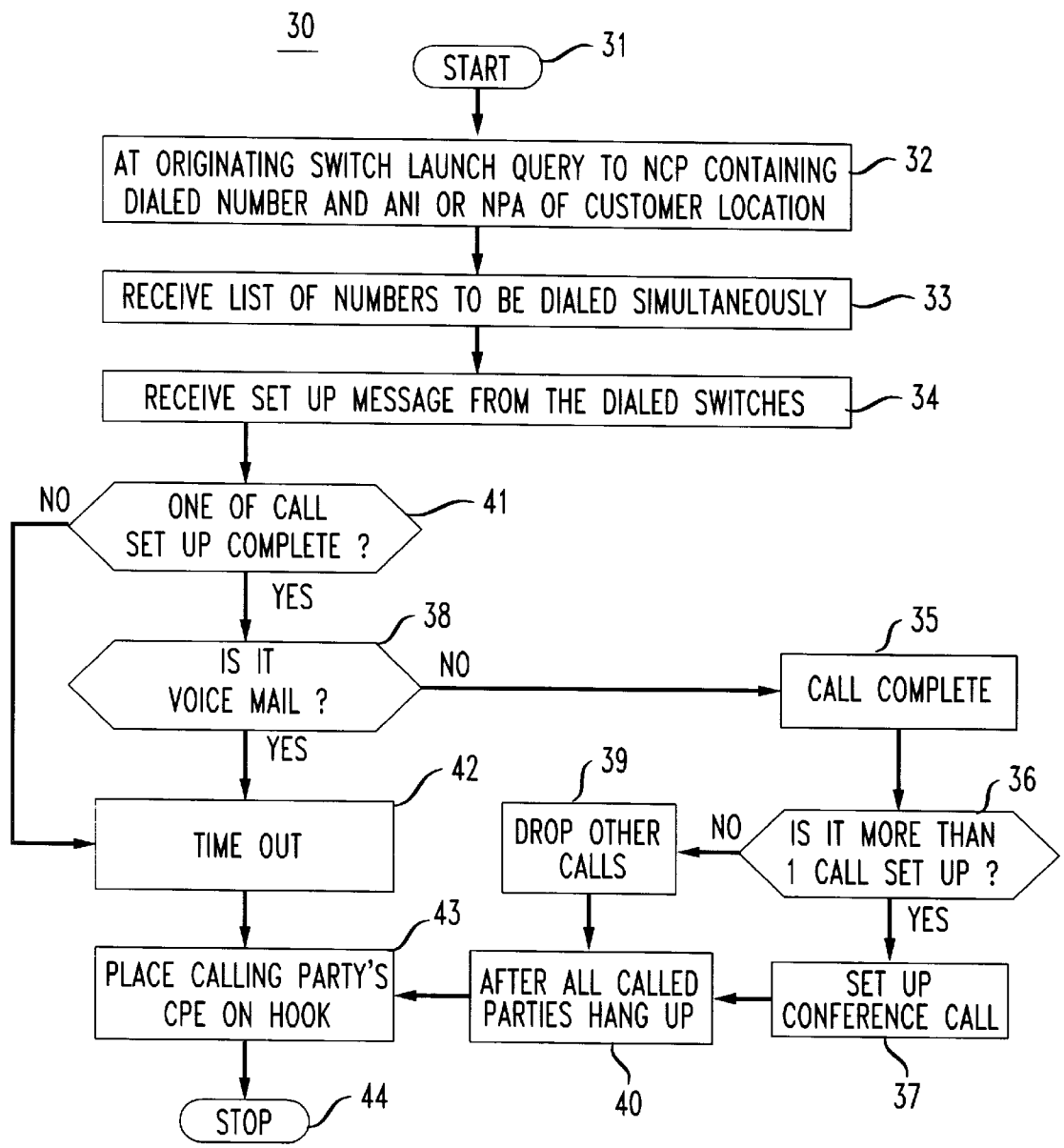
FIG. 3 depicts a flow chart of the processing at the Originating Switch according to the present invention.

Turning to FIG. 3, depicted therein is a flow chart of the processing of a telephone call according to the present invention.

First, the OS launches a query to the NCP containing a dialed number and ANI or NPA of a customer location (element 32). Next, the OS receives a list of numbers to be dialed simultaneously (element 33). The OS then receives a set up message from the dialed switches (element 34).

Now, the OS determines whether the setup for one call is complete (element 41). If Yes, processing moves to element 38, in which the OS then determines whether the call is complete to a voice mail system. If No, processing moves to element 42, in which the OS waits for a Time Out. After the time out (element 42), the OS places the calling party's CPE on Hook, and the application ends (element 44).

In element 38, if the OS detects a voice mail system, the OS waits for the voice mail system to time out (element 42), where processing continues as described above. If the OS does not detect a voice mail system, the OS declares the call complete (element 35), and then processing moves to element 36, in which the OS determines whether there is more than one call set up. If Yes, then the OS sets up a conference call (element 37). If No, the OS drops all other calls (element 39), and after detecting that all called parties have hung up (element 40), the OS places the calling party's CPE on Hook (element 43), and processing ends as described above.

After setting up the conference call (element 37), the processing moves to element 40, in which the OS waits for all parties to hang up, after which processing continues as described above.

What is claimed is:

1. A method for use in a telecommunications system for automatically routing a call made to a particular called number associated with a customer in accordance with a previously stored plurality of telephone numbers, the method comprising the steps of:

a) retrieving the plurality of telephone numbers in response to detecting a dialing of the particular telephone number;

b) adaptively ordering the plurality of telephone numbers into a sequence according to a predetermined user specified criteria and information detected from a network about which telephone number from the plurality of telephone numbers was the number at which the customer was last reached, said information being stored in a data base on a call completion to the customer during a call setup processing so that the information is accessible in real time by a network control point; and c) forwarding the call to the plurality of telephone numbers according to the sequence determined in step b).

2. The method according to claim 1, wherein the user specified criteria also includes a time of day.

3. The method according to claim 1, further comprising the step of:

d) storing a customer profile in the data base accessible in real time by the network control point during the call set up processing.

4. The method according to claim 1, further comprising the step of:

d) storing a telephone number where the customer is reached in the data base accessible in real time by the network control point during a subsequent call set up processing.

5. The method according to claim 1, further comprising the step of:

d) providing a World Wide Web site via which the customer can access and modify the customer's profile.

6. The method according to claim 1, further comprising the step of:

d) providing a emergency contact list in a customer profile, which when filled in with data causes the telephone system to access all telephone numbers simultaneously in the emergency contact list upon receiving an indication that the call is an emergency call.

7. The method according to claim 1, further comprising the step of:

d) stopping a forwarding of the telephone call upon reaching the customer at one of the numbers in the sequence.

8. The method according to claim 1, farther comprising the step of:

d) allowing the customer to enter a set of parameters that enable the telecommunication system to adaptively and intelligently order the plurality of telephone numbers in a sequence so that the customer can be reached as quickly as possible.

9. A network controller for routing a placed call, comprising:

a) a processor determining where to place the call;

b) a data base being coupled to the processor and storing a plurality of data elements for each customer, said plurality of data elements including:

(i) a customer calling number indicating that a query to a network control point is needed before initiating the call set up;

(ii) a preferred call set up algorithm including a plurality of alternate telephone numbers;

(iii) a preferred calling number for each day of the week and time of day;

(iv) a calling number where a most recent call was completed; and (v) a list of emergency contacts;

c) means for collecting a most recent data detected from a network about which telephone number from the plurality of alternate telephone numbers was the number at which the customer was last reached on a call completion to the customer during a call setup processing, and d) means for storing in the data base during the call setup processing the most recent data on the call completion collected by the collecting means so that the information is accessible in real time by a network control point.

10. The controller according to claim 9, further comprising means for multi-point signaling, whereby all of the plurality of alternate telephone numbers can be dialed simultaneously.

11. The controller according to claim 9, further comprising means for modifying the customer call set up algorithms.

12. A method for routing a telephone call comprising the steps of:

a) permitting a user to define a set of call set up instructions that enable the user to define a call routing sequence and an adaptive algorithm that modifies the call routing sequence in accordance with user definable parameters and information detected from a network about a telephone number in the network at which the user was last reached, said information being stored in a data base on a call completion to the customer during a call setup processing so that the information is accessible in real time by a network control point;

b) detecting a particular telephone number being called in an originating toll switch;

c) launching a query to a network control point upon detecting the particular telephone number from the originating toll switch;

d) returning a set of call set up instructions to the originating toll switch based on a modified call routing sequence; and e) completing the telephone call via a terminating switch and a local exchange carrier egress network according to the call set up instructions.

13. The method according to claim 12, further comprising the step of:

f) routing the telephone call to a voice messaging system if the particular telephone number is busy or if there is no answer.

14. The method according to claim 12, further comprising the step of:

f) routing the telephone call to a paging system if the particular telephone number is busy or if there is no answer.

15. The method according to claim 12, further comprising the step of:

f) if the user is not available, or no one picks up the call, providing the calling party an option to refer the call to a voice mailbox.

16. The method according to claim 12, further comprising the step of:

f) providing the user the option of a distinctive ring to alert other third parties of network referred calls.

17. The method according to claim 12, further comprising the steps of:

f) collecting a call completion number once the call is completed; and g) updating the network control point database for a subsequent call set up if the user has a "Call Me where I was Last" feature.

* * * * *